United States Patent [19]
Park

[11] Patent Number: 5,671,208
[45] Date of Patent: Sep. 23, 1997

[54] PHOTODETECTOR DISPOSED ON BOTH SIDES OF AN OBJECTIVE LENS FOR RECEIVING ± 1ST ORDER DIFFRACTIVE LIGHT

[75] Inventor: Byeong-ho Park, Seoul, Rep. of Korea

[73] Assignee: Samsung Electronics Co., Ltd., Kyungki-do, Rep. of Korea

[21] Appl. No.: 581,334

[22] Filed: Dec. 29, 1995

[51] Int. Cl.$^6$ .................................................. G11B 7/00
[52] U.S. Cl. ............... 369/112; 369/44.42; 369/44.23; 369/44.32; 369/109; 369/120
[58] Field of Search .................................. 369/112, 109, 369/44.23, 44.37, 44.41, 44.12, 44.14, 110, 122, 120, 44.42

[56] References Cited

U.S. PATENT DOCUMENTS

| | | | |
|---|---|---|---|
| 5,206,852 | 4/1993 | Kim et al. | 369/112 |
| 5,216,649 | 6/1993 | Koike et al. | 369/112 |
| 5,523,989 | 6/1996 | Ishibashi | 369/109 |
| 5,553,051 | 9/1996 | Sugiyama et al. | 369/109 |

Primary Examiner—Georgia Y. Epps
Assistant Examiner—Kim-Kwok Chu
Attorney, Agent, or Firm—Sughrue, Mion, Zinn, Macpeak & Seas

[57] ABSTRACT

An optical pickup provided with a photodetector for detecting a tracking error signal includes a light source for radiating light; an objective lens disposed on an optical path between the light source and a disc which is an optical recording medium for focusing the light radiated from the light source on the optical disc; a diverter for diverting the optical path of reflected light disposed between the light source and the objective lens to prevent the light reflected from the disc from being reflected back to the light source; and a photodetector for receiving the light reflected from the disc and detecting a tracking error signal and a focusing error signal. The photodetector consists of a first photodetector having a plate divided into at least two pieces for detecting light passing through the optical-path diverter converter after being reflected from the disc; and a second photodetector disposed around the objective lens and moving together therewith, and having a plate divided into at least two pieces.

4 Claims, 4 Drawing Sheets

PHOTODETECTOR DISPOSED ON BOTH SIDES OF AN OBJECTIVE LENS FOR RECEIVING ± 1ST ORDER DIFFRACTIVE LIGHT

BACKGROUND OF THE INVENTION

The present invention relates to an optical pickup, and more particularly, to an optical pickup in which a photodetector for detecting a tracking error is reinforced.

The optical pickup generally performs recording and reproducing of information stored in a disc, an optical recording medium, in a non-contact manner.

As shown in FIG. 1, the optical pickup comprises a light source 1, a collimator 3 for changing the light radiated from light source 1 to a parallel beam, an objective lens 15 disposed in front of disc 20 for forming a light spot on a recording surface of disc 20 by focusing incident light, a light path diverting means 5 provided between light source 1 and objective lens 15 for changing a path of the incident light, and a photodetector 10 for receiving light reflected from disc 20 and detecting an information signal and an error signal.

Photodetector 10 is at least split into two plates for detecting an error signal by differentially amplifying a light quantity received by each split plate. The detected error signal includes a focus error signal (FES) and a tracking error signal (TES).

The focus error is generated due to the variation of the length between objective lens 15 and disc 20 and inclination of disc 20 occurring when disc 20 rotates.

The tracking error is generated when a light spot input to a recording surface of disc 20 performs tracking of a groove 22 or other tracks, not accurately tracking a land 21 on a desired track. A push-pull method is employed as a typical method for detecting such a tracking error. According to the push-pull method, light reflected from or diffracted by a guide groove of a disc is detected by each split plate of a photodetector which is symmetrically arranged with respect to the center of a track. The tacking error is detected by comparing the detected light quantities.

FIGS. 2A and 2B are schematic diagrams for explaining the principles of the push-pull method.

As shown in FIG. 2A, when a dividing line 11 of a photodetector 10 for receiving light reflected from a disc 20 is positioned to correspond with the center of a land 21 of disc 20, a symmetric reflected/diffractive distribution 31 is obtained. In the meantime, in FIG. 2B, when dividing line 11 of photodetector 10 does not correspond with the center of land 21 of disc 20, an asymmetric reflected/diffractive distribution 32 is obtained.

Referring to FIG. 1, the incident light radiated from light source 1 and forming a light spot on disc 20 by focusing through objective lens 15 is reflected from land 21 or groove 22 of the disc recording surface. Here, the reflected light is a reflected/diffractive light having a diffractive angle varying according to a surface position of land 21 or groove 22. There is an area where each of a ±1st order diffractive lights among these reflected/diffractive lights overlaps with a zeroth order diffractive light. The diffractive light of the overlapping area is received by each split plate of bisectional photodetector 10 along a light path via objective lens 15. By comparing the received light quantities, TES can be detected. However, since an area where the zeroth order diffractive light does not overlap with the ±1st order diffractive lights do not pass through objective lens 15, the area is not used for the detection of TES.

In such a method of detecting TES using the push-pull method, a direct current offset occurs in the following manner.

First, as shown in FIG. 3, although optical axes of the light source, the objective lens and the photodetector are designed to coincide, it happens that objective lens 15 traveling along the spiral track shifts from the light axis of photodetector 10 by an interval of Δx. Thus, although the light passing through objective lens 15 is disposed at the center of the track, the optical axis of photodetector 10 deviates from that of objective lens 15, and thus, TES cannot be correctly detected.

Second, when the disc has an inclination with respect to the optical axis at a predetermined angle, the distribution of light amount received by the photodetector varies according to the displacement of the optical axis of the reflected light. Thus, the direct current offset occurs in TES.

There are other reasons for the direct current offset, e.g., a change of light amount distribution due to an improper shape of the groove.

Previously, a method using a circuit for detecting displacement of a lens and removing the direct current offset according to the displacement has been studied as a means for reducing the above-mentioned direct current offset. Since the deviation of the optical axis in a real optical system cannot be accurately detected, however, an effective application of the method is difficult.

SUMMARY OF THE INVENTION

To solve the above problems, it is an object of the present invention to provide an improved optical pickup which effectively reduces a direct current offset due to deviation of an optical axis in an optical system and thus accurately detects a track error signal.

Accordingly, to achieve the above object, there is provided an optical pickup comprising: a light source for radiating light; an objective lens disposed in an optical path between the light source and a disc which is an optical recording medium for focusing the light radiated from the light source on the optical disc; means for diverting the optical path disposed between the light source and the objective lens to prevent the light reflected from the disc from reflecting back to the light source; and a photodetector for receiving the light reflected from the disc and detecting a tracking error signal and a focusing error signal, wherein the photodetector comprises: a first photodetector having a plate divided into at least two pieces for detecting light passing through the optical-path diverting means after being reflected from the disc; and a second photodetector disposed on both sides of the objective lens and moving together therewith, and having a plate divided into at least two pieces.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
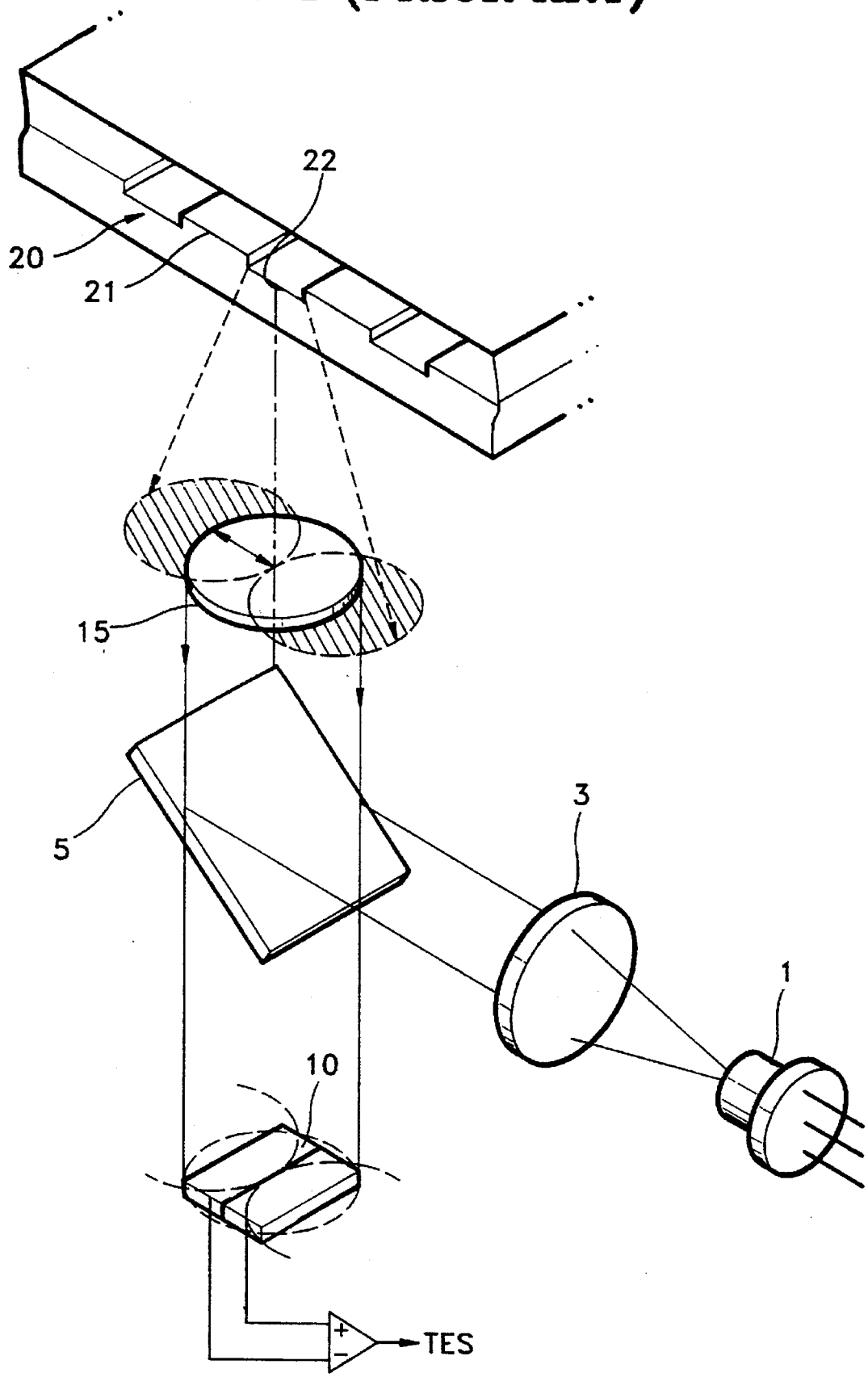
FIG. 1 is a schematic diagram illustrating an optical arrangement of a general optical pickup.
Figure 2A:
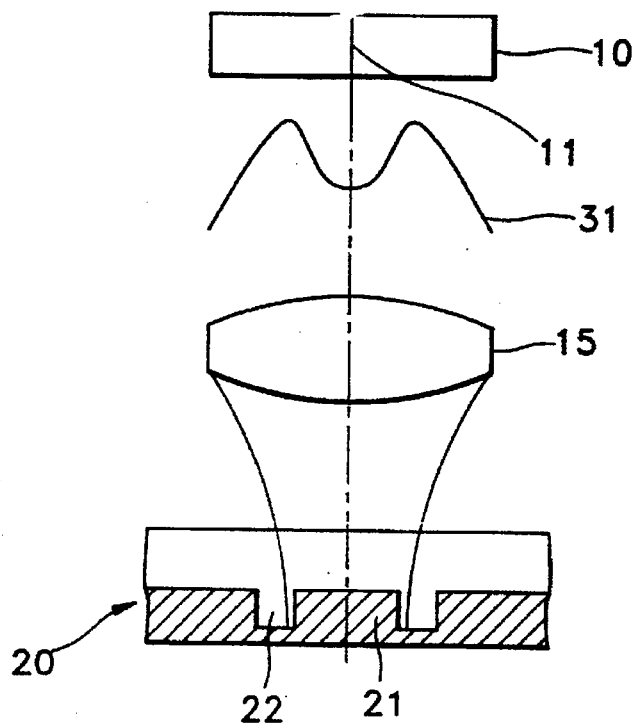
FIGS. 2A and 2B are schematic diagrams for explaining a push-pull method for detecting the tracking error signal.
Figure 2B:
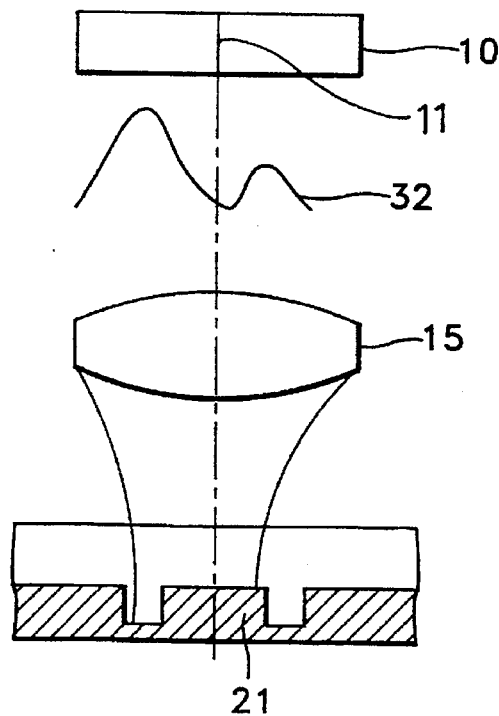
Figure 3:
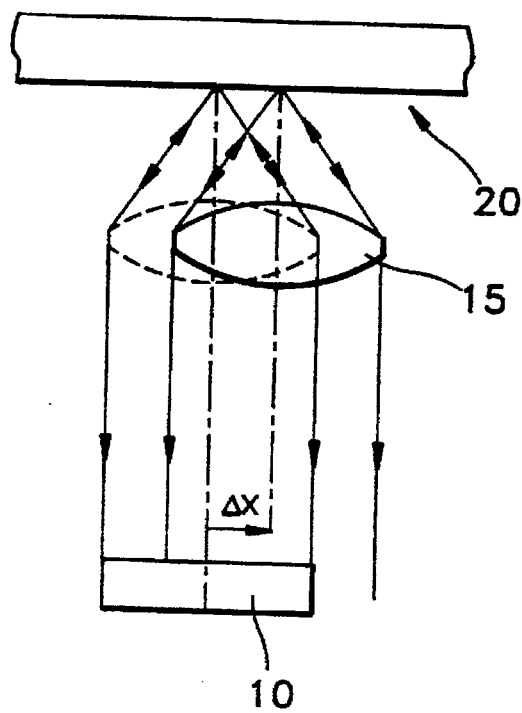
FIG. 3 is a schematic diagram for explaining the offset due to displacement of the object.
Figure 4:
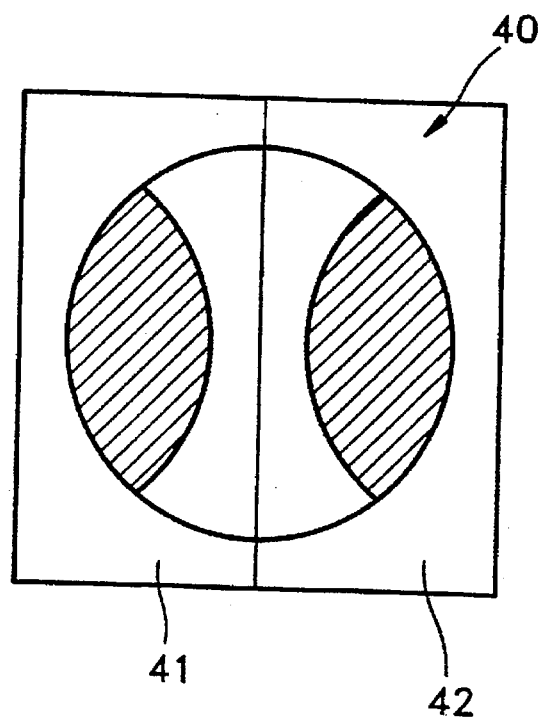
FIG. 4 is a schematic diagram illustrating a first photodetector for receiving a reflected/diffractive light passing through the objective lens after reflected from the disc.
Figure 5:
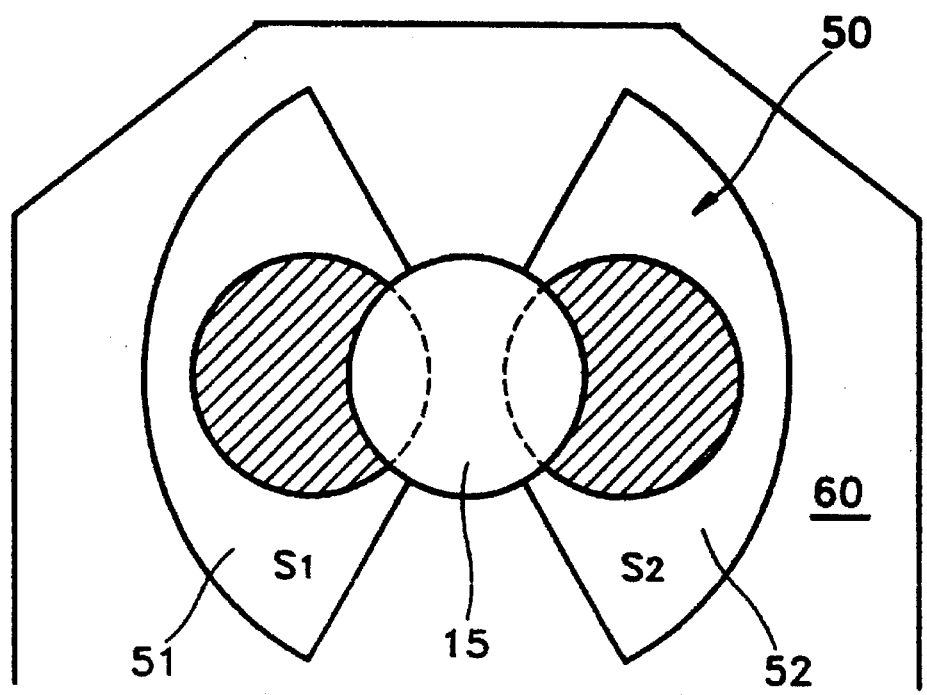
FIG. 5 is a schematic diagram illustrating a second photodetector installed to be adjacent to the objective lens for receiving ±1st diffractive lights which do not pass through the objective lens.

Referring to FIG. 4, a first photodetector 40 having the same structure as the conventional one described above is arranged in an optical path of light which is reflected from a disc and passes through an objective lens. First photodetector 40 is usually split into a pair of split plates 41 and 42, and light quantities detected from each split plate are compared and then used for detection of TES (tracking error signal). The effect of a direct current offset due to deviation of an optical axis of objective lens (see FIG. 5) 15 is not reflected in the detected error signal. To compensate for the above fact, the preferred embodiment has a second photodetector 50 as shown in FIG. 5. Second photodetector 50 is installed adjacent to objective lens 15 on an actuator 60 for supporting and actuating objective lens 15. Second photodetector 50 receives ±1st order diffractive light among light diffracted by and reflected from land and groove portions of the disc. Second photodetector 50 is disposed at both sides of objective lens 15 to receive a portion of light not passing through objective lens 15 among ±1st order diffractive light, and includes first and second split plates 51 and 52 for receiving +1st order and −1st order diffractive light, respectively.

Since second photodetector 50 moves along with objective lens is, the light amount received by second photodetector 50 is not affected by the optical path deviation of objective lens 15. Accordingly, the distribution of light amount detected by second photodetector 50 accurately indicates displacement of the central point of a spot with respect to the recording surface of the disc.

Also, though objective lens 15 performs accurate tracking, inconsistency of a light amount received by two split plates 51 and 52 of second photodetector 50 may occur due to inclination of the disc. In this case, an error signal according to the inclination of the disc can be detected by forming a light spot on the central portion of the land of the disc and analyzing the light amount received by both the split plates of second photodetector 50.

Thus, second photodetector 50 can be used as a means for compensating for inclination of an optical recording medium, which is especially a problem with recording media having a great radius such as a laser disc.

Figure 6:
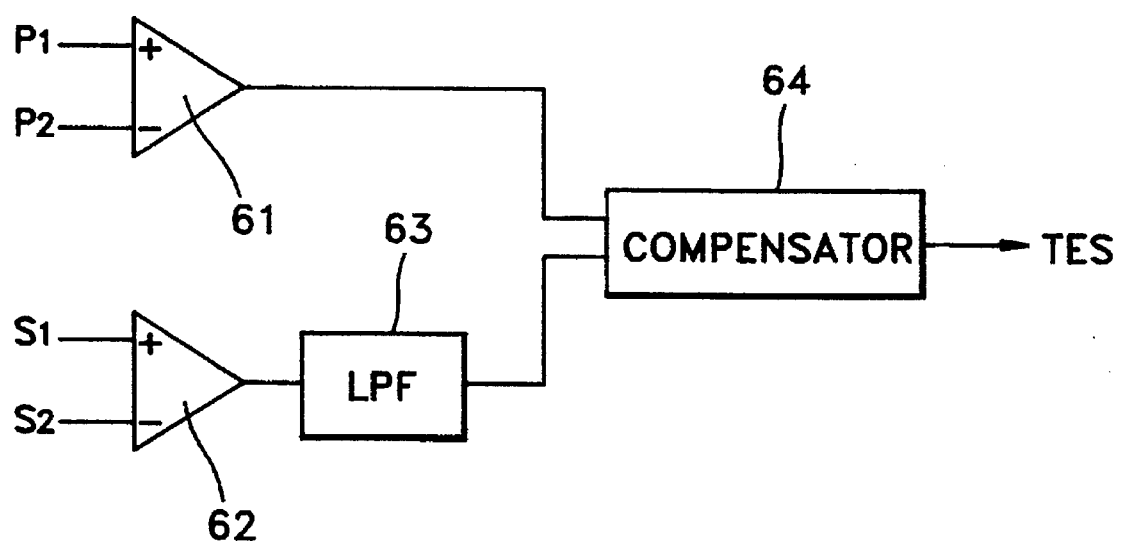
FIG. 6 is a circuit diagram in which signals detected by the two-photodetectors shown in FIGS. 4 and 5 are processed and the tracking error signal is output.

A circuit schematically shown in FIG. 6 is for compensating for tracking error signals detected from first and second photodetectors 40 and 50 shown in FIGS. 4 and 5, respectively. Referring to the drawing, the compensation for the tracking error signal will be described as follows. Reference numerals P1 and P2 denote signals indicating light amount received by both the split plates of first photodetector 40, respectively. Reference numerals S1 and S2 denote signals indicating light amount received by the first and second split plates of second photodetector 50, respectively.

A first differential amplifier 61 for receiving signals P1 and P2 generated by first photodetector 40 through two input ports and generating a first TES by differentially amplifying the signals is provided. A second differential amplifier 62 for receiving signals S1 and S2 generated by second photodetector 50 through two input ports and generating a second TES by differentially amplifying the signals is provided. The first and second TES's output through both differential amplifiers 61 and 62 either correspond with each other or are different from each other due to the optical axis deviation.

A low pass filter (LPF) 63 for removing a high frequency component included in the second TES detected by second photodetector 50 is provided at an output port of second differential amplifier 62. A signal compensator 64 for performing appropriate compensation according to characteristics of the optical pickup, e.g., additively or differentially amplifying the first and second TES's detected by both differential amplifiers 61 and 62, is provided. Each input port of signal compensator 64 is connected with an output port of first differential amplifier 61 and that of low pass filter 63, respectively. Signal compensator 64 compensates for the first TES detected by first photodetector 40 by using the second TES detected by second photodetector 50. The first TES compensated for in signal compensator 64 is transferred to actuator 60 for actuating objective lens 15, and thus, tracking of the optical pickup is controlled.

As described above, according to the optical pickup of the present invention, the direct current offset generated due to the characteristics of the disc can be efficiently reduced using the additional second photodetector, thereby accurately detecting TES.

What is claimed is:

1. An optical pickup comprising:

a light source for radiating light;

an objective lens disposed on an optical path between said light source and a disc, which is an optical recording medium, for focusing the light radiated from said light source on the optical disc;

means for diverting an optical path disposed between said light source and said objective lens to prevent the light reflected from the disc from reflecting back to said light source; and a photodetector for receiving the light reflected from the disc and detecting a tracking error signal and a focusing error signal, wherein said photodetector comprises:

a first photodetector having a plate divided into at least two pieces for detecting light passing through said optical path diverting means after the light is reflected from said disc; and a second photodetector including a plate divided into at least first and second pieces which are disposed on opposite sides of said objective lens and fixed to said objective lens to move together with said objective lens, wherein said first and second pieces of said divided plate of said second photodetector receive +1st order diffractive light and −1st order diffractive light, respectively, which is diffracted by and reflected from said disc and which does not pass through said objective lens.

2. An optical pickup as claimed in claim 1, wherein said first and second pieces of said second photodetector are of the same shape and are symmetrically arrayed with respect to said objective lens.

3. An optical pickup as claimed in claim 1, further comprising:

a first differential amplifier for receiving electrical signals generated in response to light detected in each of said two pieces of said divided plate of said first photodetector and outputting a first tracking error signal by differentially amplifying the received signals;

a second differential amplifier for receiving electrical signals generated in response to light detected in each of said first and second pieces of said divided plate of said second photodetector and outputting a second tracking error signal by differentially amplifying the received signals; and a signal compensator for compensating for the first tracking error signal using the second tracking error signal and outputting a compensated tracking error signal.

4. An optical pickup as claimed in claim 3, further comprising a low pass filter disposed between an output port of said second differential amplifier and an input port of said signal compensator for removing a high frequency component included in said signal output from said second differential amplifier.

* * * * *